United States Patent Office 3,836,447
Patented Sept. 17, 1974

3,836,447
PROBE FOR DETECTING THE LEVEL OF SUBSTANCES IN FLUID BODIES
Donald R. Emmons, 11222 Astronaut Blvd., Orlando, Fla. 32809
Filed Nov. 10, 1972, Ser. No. 305,237
Int. Cl. G01n 27/30, 27/52
U.S. Cl. 204—195 R                                    6 Claims

ABSTRACT OF THE DISCLOSURE

The addition of substances, such as chlorine, to fluid bodies is controlled and the concentration of such substances is monitored by a system including a temperature compensated probe for measuring the concentration, and electronic means responsive to outputs of the probe for adding the substance, as needed, to the desired level.

BACKGROUND OF THE INVENTION

1. Field of the Invention

The present invention relates to systems and methods for monitoring and automatically controlling the amount of substances to fluid bodies.

2. Description of the Prior Art

Chlorine is frequently added as a bleaching and disinfecting agent for swimming pools, in sewage treatment facilities, air conditioning water cooling towers, breweries, and the like. In such uses for chlorine and similarly employed substances, it is necessary to control the concentration of the substance within fairly accurate limits, to insure that the described disinfecting action takes place in an economical manner. For example, the chlorine concentration is swimming pools is generally kept at between 0.5–3.0 parts per million (p.p.m.).

In many cases swimming pool and other water supply operators are required to monitor the chlorine level several times daily, to insure that the proper level is kept. Often, this monitoring operation simply comprises a sample on which a chlorine level test is administered by the operator. The chlorine is then added mechanically or manually to adjust the chlorine concentration. However, this type of operation is expensive and time consuming.

Automatic station-keeping systems for monitoring and controlling the addition of chlorine have been devised. See for example U.S. Pats. 3,481,857 to Gray and 3,378,-479 to Colvin et al. Other techniques are also disclosed by Baker and Griffin, in the *Journal of the AWWA*, April 1958, at page 489; and by Grune and Chueh, at page 479 of Volume 30, *Sewage and Industrial Wastes*, 1958.

SUMMARY OF THE INVENTION

The present invention comprises a probe for detecting the level of substances in a fluid body. The probe comprises two dissimilar electrodes being disposed in spaced relationship with each other. Associated with the probe are means for applying a current between the electrodes so as to allow current to be conducted in one direction from one electrode to the other. The voltage produced between the electrodes corresponds to the oxidation level of the substance therebetween.

THE DRAWINGS

DETAILED DESCRIPTION

Figure 1:
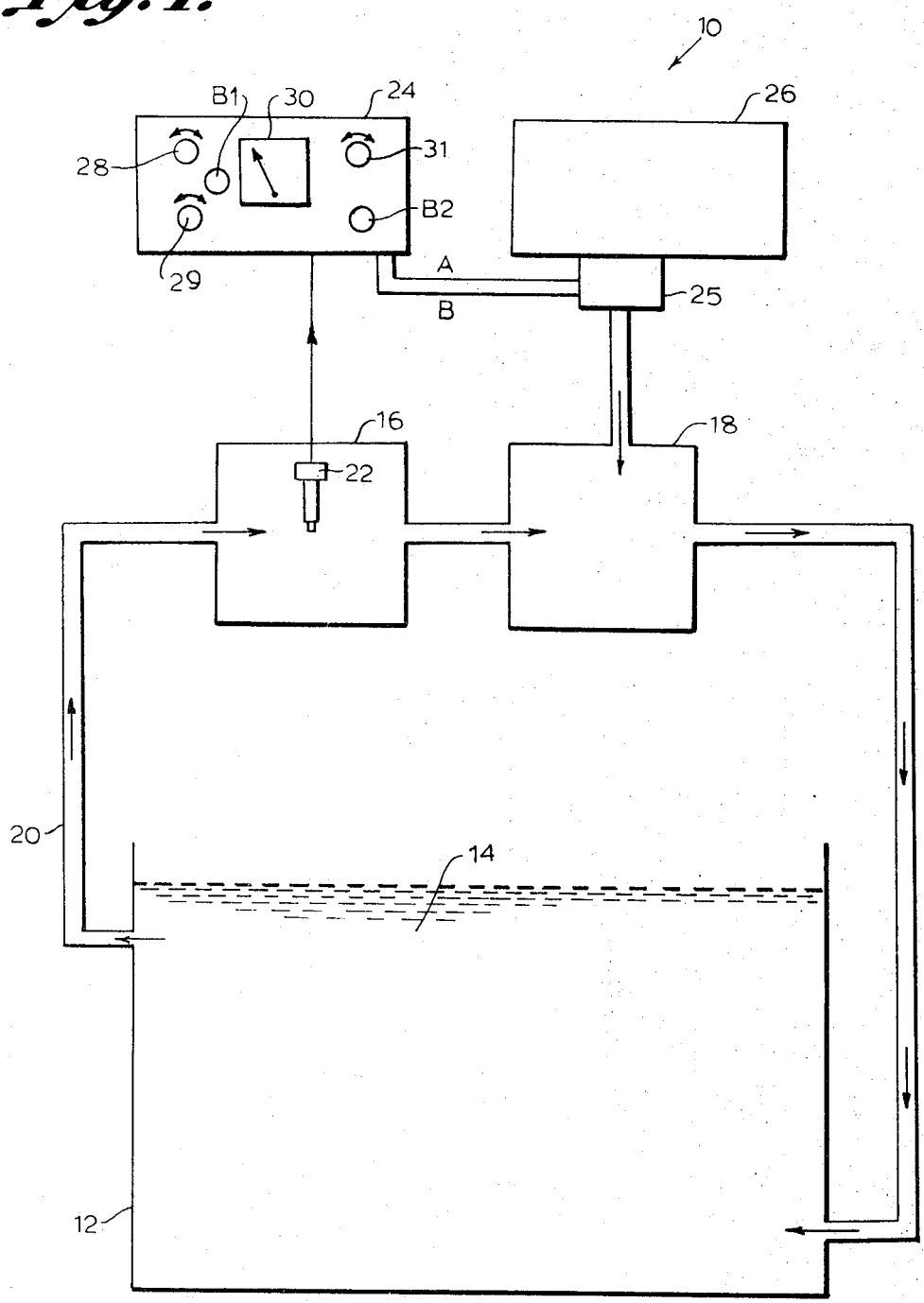
FIG. 1 is a block diagram of a system in accordance with the present invention.

A system for monitoring and controlling the chlorine concentration in a swimming pool is shown in FIG. 1 and described with reference thereto. While chlorine and the chlorine concentration in swimming pools is described in this embodiment, it will be understood that the system may be used to monitor and control the level of a variety of substances.

The system, referred to generally as 10, includes a swimming pool 12 adapted to contain water 14 therein. A chlorine monitoring chamber 16 and a separate chlorine adding chamber 18 communicate in series with each other and with the swimming pool 12 via piping 20, such that water flow is initially out of the swimming pool, into the monitoring chamber 16, through the adding chamber 18 and thence is returned to the swimming pool. Water flow is sustained by pumping means (not shown).

Figure 2:
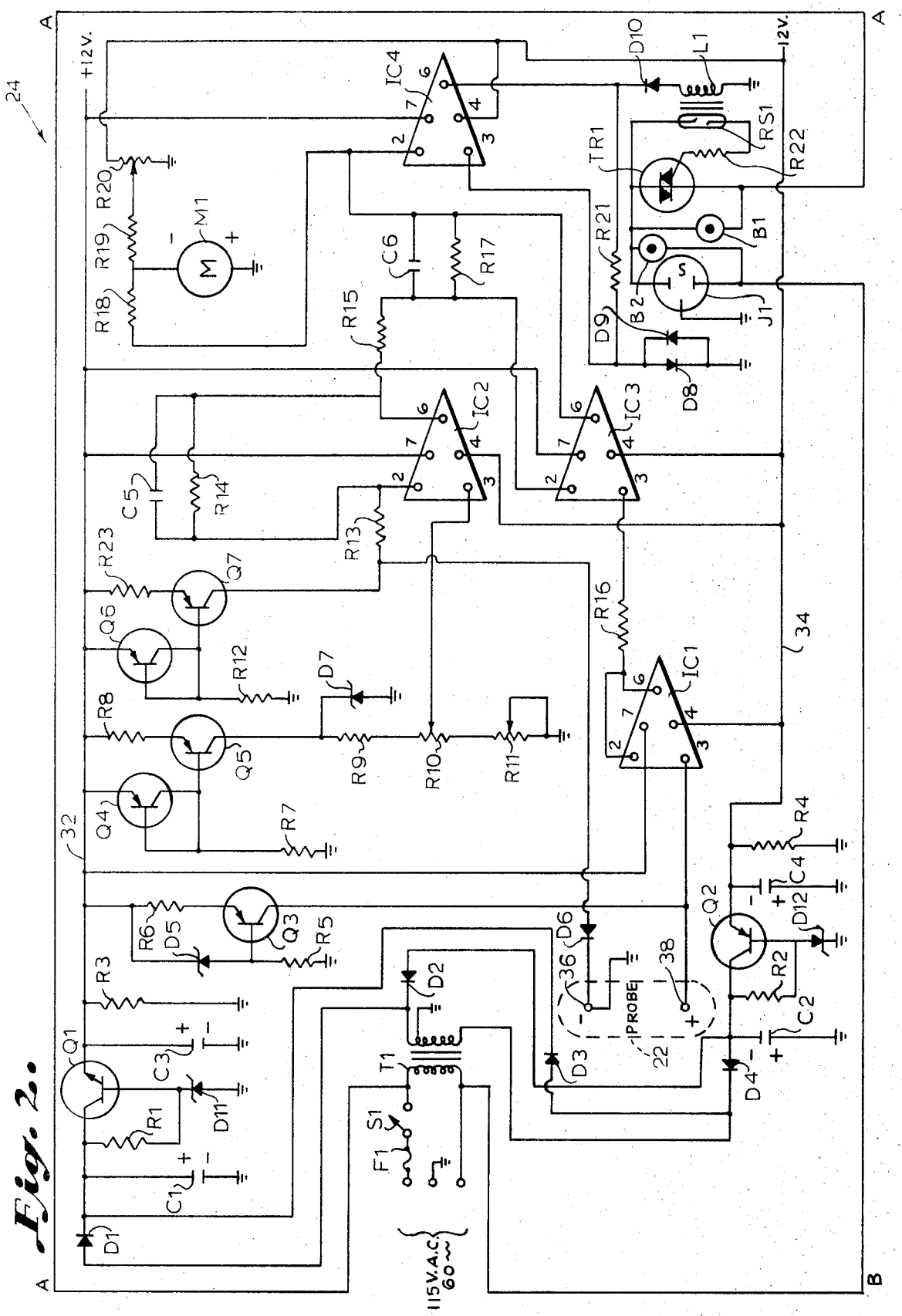
FIG. 2 is a schematic circuit diagram of a portion of the system of FIG. 1.
Figure 3:
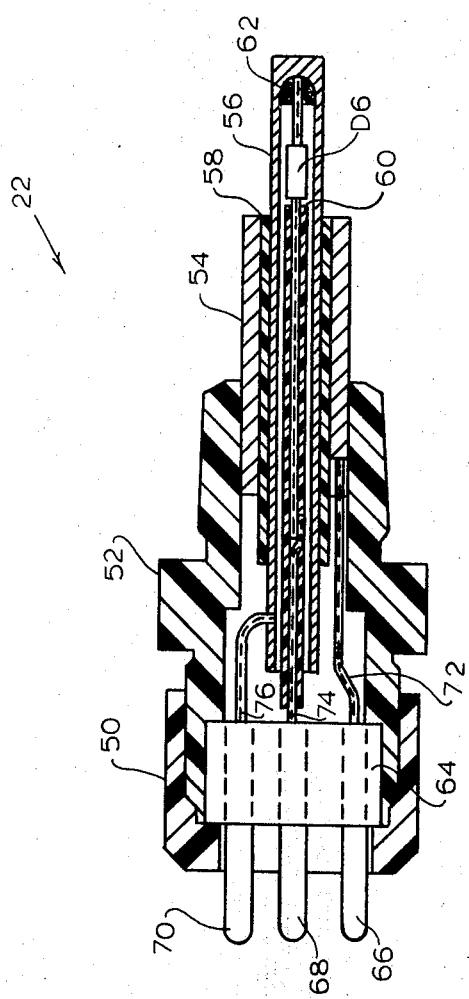
FIG. 3 is a cross section of a probe employed in the system of FIG. 1 and in conjunction with the circuit of FIG. 2.

A chlorine level probe 22, hereinafter described in greater detail with respect to FIGS. 2 and 3, is disposed in the flow path of water flowing through the monitoring chamber 16. The probe 22 is adapted to provide an electrical signal input to a control circuit 24, which input is proportional to the level of the chlorine in the water in the monitoring chamber 16.

The control circuit 24 is adapted to receive the input signal from the probe 22 and, if the input signal indicates that chlorine is below a desired level, the control circuit initiates an energizing signal via circuit lines A and B to a motor associated with a chlorine storage facility 26, such that chlorine is added in the chlorine adding chamber 18 in order to raise the level of the chlorine. Further, the control circuit 24 includes an adjustable control means which allows the described chlorine level controlled by the system to be predetermined and thereafter controlled at that level of the system. The control means may include a coarse adjustment 28 and a fine adjustment 29, for example. The circuit 24 also includes indicating means, such as a meter 30, for visually indicating the concentration of chlorine in the water, as measured by the probe 22. In the present embodiment, the circuit includes a meter control 31 and indicating bulbs B1 and B2.

An embodiment of the control circuit 24 of the present invention is shown in FIG. 2. The circuit includes a variety of active and passive circuit elements, including capacitors (C), resistors (R), transistors (Q), integrated circuits (IC), triac (TR), diodes (D), ammeter (M), inductor L), transformer (T), reed switch (RS), switch (S), bulbs (B), fuse (F), and a standard AC cable (J), all of which are designated by the appropriate capital letter or letters and a corresponding numeral, in a manner well known in the electronics art. A parts list of the circuit configuration is attached hereto as Appendix 1; it will be understood, however, by those skilled in the art that various modifications and changes with respect to specific elements and sub-combinations of elements can be made in the circuit 24 without departing from the scope of the present invention.

In the circuit 24, 115 volt AC line voltage is stepped down to 34 volts in transformer T1, with 17 volts between each side of the secondary winding and the grounded center tap. Diodes D1–4, transistors Q1 and 2, resistors R1–4, capacitors C1–4 and Zener diodes D11 and 12 comprise a known power supply circuit which provides relatively stable bias voltages of a +12 volts between a first bus line 32 and ground, and a —12 volts between a second bus line 34 and ground.

The probe 22, which is represented schematically in FIG. 2, includes first and second terminals 36 and 38, respectively, the second terminal being positive with respect to the first erminal when the circuit 24 is energized. The second terminal 38 is coupled to the positive input terminal of the first operational amplifier IC1. This positive input is identified as terminal 3 in accordance with standard operational amplifier notation, in which the negative and positive input terminals of the operational amplifier are identified by the numerals 2 and 3, respectively, the output terminal by 6, and the negative and positive bias terminals by 4 and 7, respectively. Operational amplifier IC1 is a voltage follower having the output terminal 6 shorted to the negative input terminal 2.

The circuit 24 further comprises an NPN transistor Q3 having the emitter terminal thereof coupled to the +12 volt bus line 32 through resistor R6. The cathode of Zener diode D5 is coupled to the +12 bus line 32, with the anode thereof tied to the base of transistor Q3. The base of transistor Q3 is tied to ground through resistor R5. The collector of transistor Q3 is coupled to the second terminal 38 of the probe 22.

The first terminal 36 of probe 22 is coupled to the cathode of the diode D6, which is physically located within the probe 22, as hereinafter described in greater detail with reference to FIG. 3. The anode of diode D6 is coupled to the negative input terminal 2 of the second operational amplifier IC2 through resistor R13. The transistor Q6 is diode-connected (base connected to collector) to the base of transistor Q7, with the collector of transistor Q7 coupled to the node connecting the anode of the diode D6 and resistor R13. The base of transistor Q6 is coupled to ground through resistor R12. The emitters of transistor Q6 and Q7 are coupled to the +12 volt bus line 32 with the emitter of transistor Q7 being coupled through resistor R23. The two transistors Q6 and Q7 and the associated resistors R12 and R23 are a constant current source which provides a relatively stable current into the diode D6 in order to bias that diode. As noted in the Appendix, the same transistor type is selected for transistors Q6 and Q7 in order to achieve a high degree of temperature compensation.

Transistor Q4 is likewise diode-coupled to transistor Q5, and with the associated resistors R7 and R8 providing a constant current source in a manner like that described above with respect to transistor Q6 and Q7. The collector of transistor Q5 is coupled to the cathode of Zener diode D7, the anode of which is coupled to ground. Potentiometers R10 and R11 are connected in series with each other to ground and in parallel with the Zener diode D7. The variable wiper of potentiometer R10 is coupled to the positive input terminal 3 of the second operational amplifier IC2, and the wiper of the potentiometer R11 is grounded. As thus configured, the circuit of transistors Q4 and Q5 provides a constant current to the positive terminal 3 of the second operational amplifier IC2, and thus establish a reference voltage thereto which biases the entire circuit at the operating point determined by that reference voltage. This reference voltage level can then be varied and predetermined by adjustment of the potentiometers R10 and R11, as hereinafter described.

The second operational amplifier IC2 comprises a gain amplifier, the gain of which is determined by the feedback circuit comprising resistor R14 and capacitor C5 connected in parallel between the output terminal 6 and negative input terminal 2 thereof. The third operational amplifier IC3 is similarly connected as a gain amplifier, in which the gain is determined by the feedback loop of resistor R17 and capacitor C6. The output terminal 6 of the second operational amplifier IC2 is coupled to the negative input terminal 2 of the third operational amplifier IC3 through resistor R15, and the output terminal 6 of the first operational amplifier IC1 is coupled to the positive input terminal 3 of the third operational amplifier through resistor R16.

The output terminal 6 of the third operational amplifier IC3 is directly coupled to the negative input terminal 2 of the fourth operational amplifier IC4. While the fourth operational amplifier IC4 is described as an operational amplifier, that device serves as a threshold detector, and any integrated circuit or similar circuit arrangement capable of open loop voltage gain operation and with an extremely high minimum voltage gain will suffice.

Diodes D8 and D9 are reverse-poled relative to each other in parallel between ground and the positive input terminal 3 of the fourth operational amplifier IC4. Resistor R21 is coupled between the output terminal 6 and the positive input terminal 3 of the fourth operational amplifier IC4. In the negative input circuit of the fourth operational amplifier IC4, resistors R18 and R19 are coupled in series with each other to the negative input terminal 2 thereof, with the ammeter M1 coupled between resistors R18 and R19 to ground. In this embodiment, ammeter M1 corresponds to the meter 30 of FIG. 1. Resistor R19 is coupled to the wiper terminal of potentiometer R20, which is coupled between the −12 bus line 34 and ground.

The output terminal 6 of the fourth operational amplifier IC4 is coupled to the cathode of diode D10, the anode of which is coupled through the inductor L1 to ground. The inductor L1 is coupled to the reed switch RS1, which is in turn coupled to resistor R22 between the gate and a first one of the main terminals of the triac TR1. The other main terminal of the triac TR1 is coupled to one side of the line voltage (A), and a bulb B1 is coupled between the two main terminals of the triac. The first main terminal is connected to one prong of a three pronged AC cable J1, the other prong of which is coupled to the other side of line voltage (B). A bulb B2 is coupled between the two current conducting prongs of the line cord.

The probe 22 will now be described with reference to FIG. 3. The probe 22 comprises a hollow core ferrule nut 50 formed of an insulating material, and adapted to be mounted on the wall of the chlorine monitoring chamber 16 (note FIG. 1). A hollow core male connecter 52 extends into the ferrule nut 50, as shown in FIG. 3. A first tubular electrode 54 is mounted on the male connector 52 and extends out of the core of the connecter. A second tubular electrode 56 is mounted coaxially in the first metal electrode 54 and extends out of the first electrode in the same direction that the first electrode extends out of the connecter 52. An insulating tube 58, such as Teflon, is interposed between the first and second electrodes 54 and 56.

The first and second electrodes 54 and 56 comprise two materials having dissimilar contents. Preferably, the electrodes 54 and 56 comprise two dissimilar stainless steel alloys. By way of example, it has been found that electrode 54 may comprise stainless steel alloy No. 304 and electrode 56 may comprise stainless steel alloy No. 416.

A second hollow insulating tube 60 is disposed inside the second electrode 56. Diode D6 is disposed inside the extended end of the second electrode 56, with the cathode of that diode electrically coupled to the second electrode, as with a conductive epoxy 62, for example. The anode of diode D6 extends through the second insulating tube 60. A three-pin connector 64 is fitted inside the ferrule nut 50, and includes three conductive pins 66, 68 and 70 extending therethrough. A first one of the pins 66 corresponds to the second terminal 38 of FIG. 2 and is electrically coupled to the first, outermost electrode 54 via a wire 72. The inner pin 68 corresponds to the first terminal 36 of FIG. 2, and is electrically coupled to the anode of diode D6 via a wire 74 extending through the second hollow insulating tube 60. The third pin 70 is electrically coupled to the second, innermost electrode 56 by a wire 76. The three pins 66, 68 and 70 are interconnected with the circuit 24 of FIG. 2 by a cable (not shown).

The manner in which the probe 22 and the circuit 24 monitors and controls the amount of chlorine added in the swimming pool 12 will now be described.

With the switch S1 closed and the circuit 24 energized, the constant current circuit including transistors Q6 and Q7 provides a stable supply current to diode D6 and a bias current between the metal electrodes 54 and 56 of FIG. 3. As the water flows past the electrodes 54 and 56, the dissimilar materials of the electrodes and the chlorine act in combination in a known manner as an electrolytic cell, the voltage level of which is dependent upon the oxidation level of chlorine in the water.

In accordance with the present invention, since diode D6 is biased at a constant current level and is in the path of water flow, then the voltage across the diode changes with respect to variations in the temperature of the water. Further Zener diode D5, transistor Q3 and the associated circuitry provide a small signal current which "bucks" the current flow between electrodes 56 and 54 (to ground). In the past, one difficulty with electrolytic probes has been the tendency for oxide coatings to form on the electrodes and alter and degrade monitoring characteristics of the probe. By providing a bucking current between the electrodes 56 and 54 in the probe 22, these detrimental coatings are largely prevented.

Noting FIG. 2, transistors Q4 and Q5 and Zener diode D7 provide a stable voltage reference of 6.0 volts to ground. Zener diode D7 is preferably a very stable compensated device with respect to temperature variations (see Appendix 1). This 6.0 volt reference voltage is divided through the series resistance of potentiometers R10 and R11. The wipers of potentiometers R10 and R11 are manually adjusted by the operator to achieve a coarse (R10) and then a fine (R11) adjustment to the desired level of chlorine in the water supply (in parts per million). Potentiometers R10 and R11 thus correspond to the coarse and fine adjustments 28 and 29 of the control circuit 24 as shown in FIG. 1. The reference voltage predetermined by the settings of potentiometers R10 and R11 then establishes a predetermined operating point for the circuit 24.

As noted above, the voltage produced between the electrodes 54 and 56 of the probe 22 reflect the amount of chlorine in the water, which voltage biases the input terminal 3 of the operational amplifier IC3 (via the voltage following operational amplifier IC1). Simultaneously, the voltage potential between the electrodes 54 and 56 appears between the negative and positive input terminals 2 and 3 of the third operational amplifier IC3. Since the output of the second operational amplifier IC2 is reference to the operating point established by the bridge defined by potentiometers R10 and R11, then the output from the operational amplifier IC3 is analagous to the difference between the voltage across those potentiometers with respect to the voltage across the electrodes 54 and 56 of the probe 22. This analagous output from operational amplifier IC3 is positive or negative, depending upon whether the voltage across the electrodes 54 and 56 is above or below the level of the reference voltage determined by the potentiometers R10 and R11.

Referring now to the fourth operational amplifier IC4, the two reverse-poled paralled-connected diodes D8 and D9 create a limiting reference voltage into the positive input terminal 3 of that operational amplifier. In this embodiment, that reference voltage has a magnitude of about 0.6 volts, the polarity of which is determined by the output of operational amplifier IC4. The resistor R21 provides a positive feedback into the positive input terminal 3.

In operation, the analagous output from the operational amplifier IC3 continuously reflects minute changes in the chlorine level, as detected by the probe 22. When the magnitude of this output slowly goes beyond the magnitude of the reference voltage into the positive input terminal 3 (0.6 volts in this example), the operational amplifier IC4 becomes saturated and its output changes polarity; that is, if the input to terminal 2 is negative and drops below the reference voltage level, then the output jumps positive and is fed back into the positive input terminal 3 through resistor R21, causing the reference voltage to terminal 3 to change polarities. In this manner, the output of operational amplifier IC4 is latched at either a positive or negative voltage level for minute changes in the analagous output of the operational amplifier IC3, which reflects the changes in chlorine content. For example, it has been found that this latching function is achieved in the circuit 24 when the output of operational amplifier IC3 changes as little as a millivolt with respect to the reference voltage into terminal 3 of the operational amplifier IC4.

If the output of the operational amplifier IC4 reflects that the chlorine level is below the desired level, then that output flows into the inductor L1, which closes the reed switch RS1. With the reed switch RS1 closed, current flows into the gate of triac TR1 causing current to flow between the main terminals of that triac. This in turn closes the circuit between line voltage and the circuit lines A and B into the motor 25 in the chlorine storage facility 26. When the motor 25 in the chlorine storage facility 26 is energized, chlorine, either as a dry participate, a liquid solution or in gaseous form, is added to the water in the chlorine adding chamber 18 (note FIG. 1). Conversely, when the probe 22 indicates that the amount of chlorine in the water is at the desired level, the output of the operational amplifier IC4 opens the reed switch RS1 which shuts down the triac TR1, thus preventing the further addition of chlorine to the water. Bulb B1 indicates when current is not flowing through the triac TR1, and bulb B2 indicates when line voltage is present. It will be appreciaited by those skilled in the art that the circuit 24 may also be used with a motor speed control circuit to control the speed at which the chlorine is added.

Again noting FIG. 2, the ammeter M1 is coupled through the resistor R18 between the negative input terminal 2 of the operational amplifier IC4 and ground. In this manner the output of the operational amplifier IC3 is visually indicated on the meter M1, again, which corresponds to meter 30 in FIG. 1. Resistor R19 and potentiometer R20 provide a positive bias to the meter, so that the meter continuously reads positive, regardless of whether the output of operational amplifier IC3 is positive or negative. Potentiometer R20 corresponds to the meter control 31 of of FIG. 1.

The present invention provides an automatic station-keeping system which monitors and accurately controls the level of substances added to fluid bodies. The probe of the present invention accurately monitors the level of the substances, with the output of the probe being compensated with respect to temperature changes of the fluid. Further, the probe of the present invention can be used for long periods of time since the deposition of harmful coatings on the electrodes of the probe is largely avoided. The present invention also comprises a circuit which will control the additions of the substance in accordance with minute changes in the level of the substance, and will latch into a switched condition when such minute changes are detected.

Another advantage of the system of the present invention insures by virtue of indications on the ammeter M1. Most large swimming pools employ a number of adjustable water jets spaced around the perimeter of the pool. When any one or more of these jets are inoperative or improperly adjusted, "dead" pockets within the pool are created which do not include the required amount of chlorine. As the water is drawn through the present system, these "dead" pockets will appear as distinct meter fluctuations, indicating to the operator that the water jets are not functioning properly. Further, air leaks on the suction side of the intake of the present system will be indicated by rapid oscillations on the meter, thus providing a continual evaluation as to the integrity of the pumping means.

APPENDIX I

R1, 2: 470 ohm
R3, 4: 2200 ohm
R5: 1000 ohm
R6: 39K ohm
R7: 390 ohm
R8: 39 ohm
R9: 10K ohm
R10: 0–2.5K ohm potentiometer
R11: 0–250 ohm potentiometer
R12: 1000 ohm
R13: 39K ohm
R14: 100K ohm
R15: 6.8K ohm
R16: 6.8K ohm
R17: 500K ohm
R18: 6.37K ohm, 1%
R19: 10K ohm
R20: 0.10K ohm potentiometer
R21: 10K ohm
R22: 270 ohm
R23: 56 ohm
C1, 2: 150 microfarad, 40 volt
C3, 4: 100 microfarad, 35 volt
C5, 6: .01 microfarad
Q1: TIP 29 (Texas Inst. Co.) PNP or equivalent
Q2: TIP 30 (Texas Inst. Co.) NPN or equivalent
Q3, 4, 5, 6, 7: 2N3906 NPN or equivalent
IC1, 2, 3, 4: 741 operational amplifier or equivalent
TR1: 2N5755 triac or equivalent
D1, 2, 3, 4: 1N4002
D5: 1N825 Zener
D6: 1N4001
D7: 1N825 Zener
D8, 9, 10: 1N4001
D11: IN759A Zener
D12: 1N759A Zener
MI: 0–1 m.a. Ammeter
L1, RS1: 900 ohm coil, pull in reed switch at 9 volts, drop out at 1 volt, or equivalent
T1: 115 volt primary, 17 volt-to-center tap secondary, secondary current rated at 300 milliamps, or equivalent.
F1: AGC-3

I claim:

1. Apparatus comprising:
   two dissimilar electrodes disposed in spaced relationship with each other;
   means for applying a voltage between said electrodes equal to the oxidation reduction potential of a substance therebetween so as to generate a current in one direction during the presence of said substance therebetween;
   means for passing a current between said electrodes in a direction opposite to said one direction so as to buck said current in said one direction;
   a diode adjacent to one of said electrodes and electrically coupled thereto for compensating said current in said one direction with respect to the temperature of a fluid between electrodes; and
   circuit means for developing a constant bias supply to said diode.

2. Apparatus as recited in Claim 1 wherein said circuit means comprises:
   two transistors of an identical type;
   each transistor including an emitter, base and collector terminals with the base and collector of one transistor both being coupled to the base of the other transistor;
   means providing a constant biasing voltage to the emitters of said transistors; and wherein
   the collector of said other transistor is coupled to one of said electrodes.

3. A probe for detecting the level of a substance in a fluid body comprising:
   an insulating member;
   inner and outer electrodes of dissimilar materials carried by said insulating member and disposed coaxially with each other in spaced relationship, said inner electrode extending beyond the extremity of said outer electrode;
   said electrodes are adapted to conduct current in one direction therebetween which varies responsive to the oxidation level of any said substance in said fluid disposed between said electrodes;
   means for passing a current between said electrodes in a direction opposite said one direction;
   a diode coupled adjacent to and in series with one of said electrodes for compensating said current with respect to the temperature of said fluid between said two electrodes; and
   means for providing a constant current into said diode.

4. A probe as recited in Claim 3 wherein said diode is electrically coupled in series with, and positioned within said inner electrode and between the extremities of said inner and outer electrodes.

5. A probe as recited in Claim 4 further comprising:
   a connector carried by said insulating member and having three conductive pins extending therethrough;
   means electrically coupling a first one of said three pins to said outer electrode;
   means electrically coupling a second one of said three pins to said second electrode through said diode; and
   means electrically coupling the third pin to said second electrode.

6. A probe as recited in Claim 5 wherein said current is conducted between said first and second pins.

References Cited

UNITED STATES PATENTS

| | | | |
|---|---|---|---|
| 1,534,709 | 4/1925 | Holt | 204—DIG. 9 UX |
| 2,651,609 | 9/1953 | Chester | 204—52 R |
| 1,534,709 | 4/1925 | Holt | 204—DIG. 9 UX |
| 3,660,249 | 5/1972 | Townsend | 204—1 T |

GERALD L. KAPLAN, Primary Examiner

U.S. Cl. X.R.

204—1 T, 272